(12) United States Patent
Kawamura

(10) Patent No.: US 9,836,847 B2
(45) Date of Patent: Dec. 5, 2017

(54) DEPTH ESTIMATION APPARATUS, IMAGING DEVICE, AND DEPTH ESTIMATION METHOD

(71) Applicant: Panasonic Intellectual Property Management Co., Ltd., Osaka (JP)

(72) Inventor: Takashi Kawamura, Kyoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 159 days.

(21) Appl. No.: 14/880,014

(22) Filed: Oct. 9, 2015

(65) Prior Publication Data

US 2016/0035099 A1 Feb. 4, 2016

Related U.S. Application Data

(63) Continuation of application No. PCT/JP2014/003966, filed on Jul. 29, 2014.

(30) Foreign Application Priority Data

Feb. 26, 2014 (JP) ................. 2014-035280

(51) Int. Cl.
*G06K 9/00* (2006.01)
*G06T 7/00* (2017.01)
(Continued)

(52) U.S. Cl.
CPC .............. *G06T 7/0069* (2013.01); *G01C 3/06* (2013.01); *G02B 7/28* (2013.01); *G02B 7/34* (2013.01);
(Continued)

(58) Field of Classification Search
None
See application file for complete search history.

(56) References Cited

U.S. PATENT DOCUMENTS 8,349,640 B2  1/2013  Soda
8,711,215 B2  4/2014  Imamura
(Continued)

FOREIGN PATENT DOCUMENTS

JP  59-94721 A  5/1984
JP  9-179015 A  7/1997
(Continued)

OTHER PUBLICATIONS

Changyin, Z. et al., "Coded Aperture Pairs for Depth from Defocus", IEEE International Conference on Computer Vision (ICCV), Oct. 2009.
(Continued)

*Primary Examiner* — Randoph I Chu
(74) *Attorney, Agent, or Firm* — McDermott Will & Emery LLP

(57) ABSTRACT

A depth estimation apparatus including: an imaging device which generates a first image signal and a second image signal by imaging an object at different phases; a storage unit configured to store model data defining a relationship between (i) lens blur and phase difference of the object in images and (ii) position of the object in the images in the depth axis; and a detecting unit configured to detect a position of the object in the depth axis from the first image signal and the second image signal, using the model data, wherein a phase difference between the first image signal and the second image signal is smaller than or equal to 15% in terms of a base line length.

12 Claims, 17 Drawing Sheets

(51) Int. Cl.
*G01C 3/06* (2006.01)
*G02B 7/28* (2006.01)
*G02B 7/34* (2006.01)
*G02B 7/36* (2006.01)
*H04N 5/232* (2006.01)
*G06T 5/00* (2006.01)
*H04N 9/04* (2006.01)
*G06T 7/571* (2017.01)

(52) U.S. Cl.
CPC ............... *G02B 7/36* (2013.01); *G06T 5/003* (2013.01); *G06T 7/571* (2017.01); *H04N 5/232* (2013.01); *H04N 5/23212* (2013.01); *H04N 9/045* (2013.01); *G06T 2207/10024* (2013.01); *G06T 2207/10028* (2013.01); *G06T 2207/20182* (2013.01); *G06T 2210/36* (2013.01)

(56) References Cited

U.S. PATENT DOCUMENTS

| | | | |
|---|---|---|---|
| 9,106,824 B2 | 8/2015 | Endo | |
| 2010/0118142 A1 | 5/2010 | Ohsawa | |
| 2011/0294251 A1 | 12/2011 | Soda | |
| 2012/0148109 A1* | 6/2012 | Kawamura | G01C 3/06 382/106 |
| 2012/0194696 A1 | 8/2012 | Ohshitanai et al. | |
| 2013/0063566 A1* | 3/2013 | Morgan-Mar | G06T 7/571 348/46 |
| 2013/0071028 A1* | 3/2013 | Schiller | G06T 5/003 382/180 |
| 2013/0120564 A1 | 5/2013 | Imamura | |
| 2013/0182152 A1* | 7/2013 | Li | H04N 5/23212 348/241 |
| 2013/0329120 A1* | 12/2013 | Hiasa | H04N 5/23212 348/345 |
| 2014/0028895 A1* | 1/2014 | Endo | H04N 5/3696 348/348 |
| 2014/0071313 A1* | 3/2014 | Hiasa | G06T 5/50 348/231.99 |
| 2015/0136982 A1* | 5/2015 | Kester | G01J 3/2823 250/332 |

FOREIGN PATENT DOCUMENTS

| | | |
|---|---|---|
| JP | 2009-222449 A | 10/2009 |
| JP | 2010-016743 A | 1/2010 |
| JP | 2010-039448 A | 2/2010 |
| JP | 2011-249680 A | 12/2011 |
| JP | 2012-118269 A | 6/2012 |
| JP | 2012-124555 A | 6/2012 |
| JP | 2012-160906 A | 8/2012 |
| JP | 5374119 B2 | 12/2013 |
| JP | 2014-26051 A | 2/2014 |
| WO | 2012/017577 A1 | 2/2012 |
| WO | 2012/132117 A1 | 10/2012 |

OTHER PUBLICATIONS

Levin, A., "Analyzing Depth from Coded Aperture Sets", The European Conference on Computer Vision (ECCV), Sep. 2010.
International Search Report issued in Application No. PCT/JP2014/003966 dated Nov. 11, 2014.

* cited by examiner

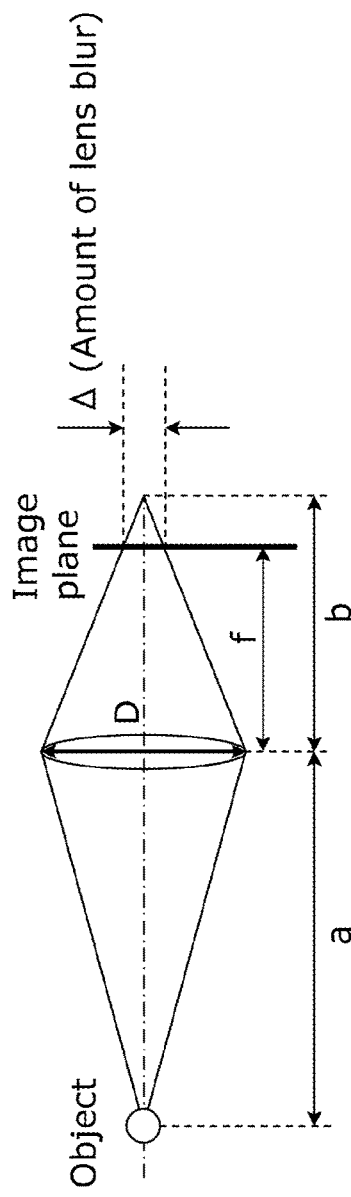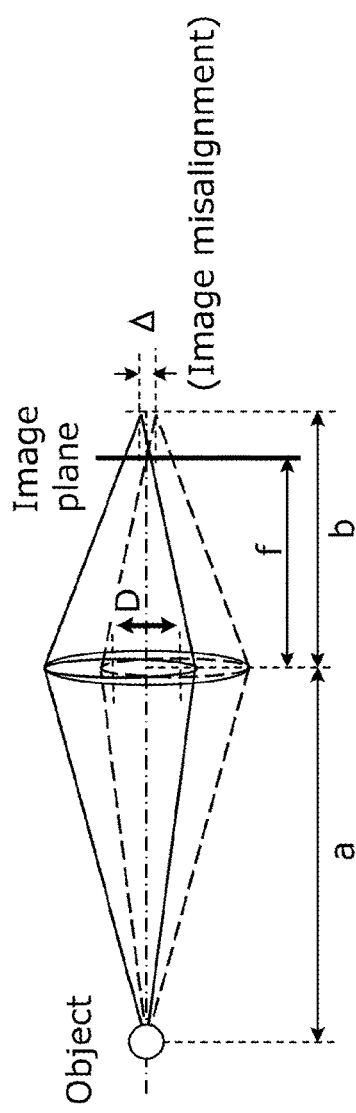

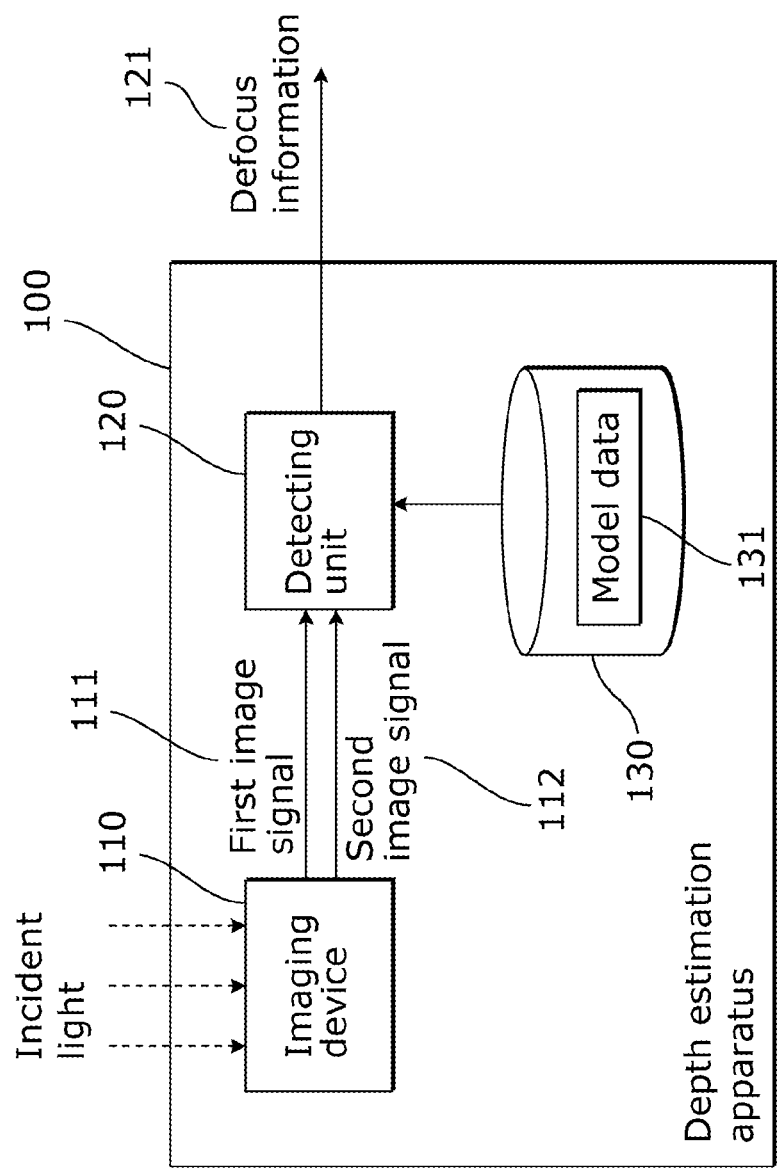

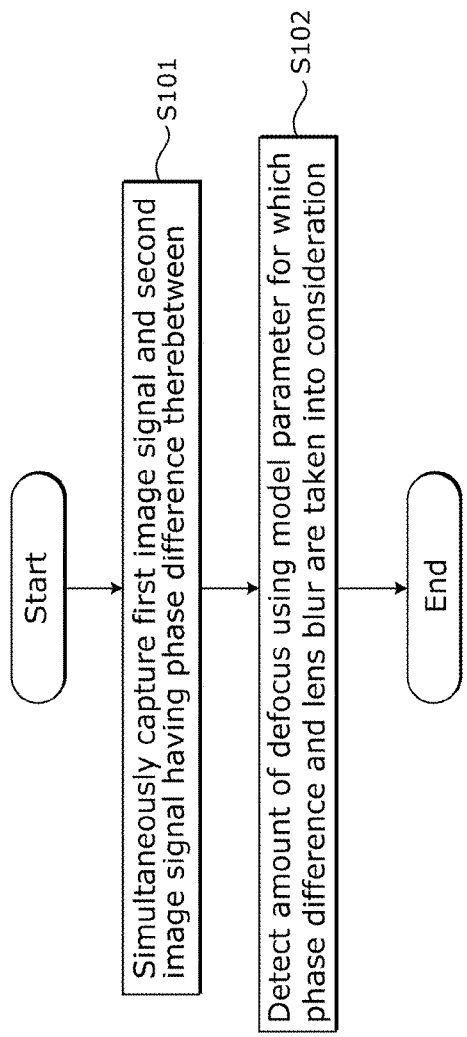

DEPTH ESTIMATION APPARATUS, IMAGING DEVICE, AND DEPTH ESTIMATION METHOD

CROSS REFERENCE TO RELATED APPLICATIONS

This is a continuation application of PCT International Application No. PCT/JP2014/003966 filed on Jul. 29, 2014, designating the United States of America, which is based on and claims priority of Japanese Patent Application No. 2014-035280 filed on Feb. 26, 2014. The entire disclosures of the above-identified applications, including the specifications, drawings and claims are incorporated herein by reference in their entirety.

FIELD

The present disclosure relates to a depth estimation apparatus, an imaging device, and a depth estimation method.

BACKGROUND

There are various methods proposed for non-contact depth measurement from three-dimensional scenes, that is, the distance to each of objects in the scene. One example is the depth from defocus (DFD) method (hereinafter also simply referred to as DFD). DFD measures the distance based on information on lens blur, the size and shape of which change depending on the object distance. The features of DFD include no need to use plural cameras and the capability of distance measurement from a small number of images. The processing of measuring the distance to an object using the DFD method is also called DFD processing.

Hereinafter, the principle of DFD will be briefly described.

DFD is a method of measuring an object distance from plural images having different focus positions, based on lens blur information. A captured image containing lens blur is an image obtained by convolving an all-in-focus image showing no lens blur caused by the lens (object texture information) with a point spread function that is a function of the object distance. Since the point spread function is a function having the object distance as the variable, DFD can determine the object distance by detecting lens blur from blurred images.

Here, the all-in-focus image and the object distance are unknown. For one blurred image, one equation is established regarding the blurred image, the all-in-focus image, and the object distance. A new equation is obtained by newly capturing, from the same visual point, a blurred image having a different focus position. By solving plural equations obtained, the object distance is determined. Regarding the method for obtaining the equations and the method for solving the equations, there are various proposals for DFD, including Non Patent Literature (NPTL) 1.

Furthermore, phase difference detection method is another method for measuring the distance to an object (see Patent Literature (PTL) 1, for example). With the phase difference detection method, images are captured which have a phase difference between a first pixel group and a second pixel group that are included in the imaging device (images captured from different visual points). Then, based on the phase difference of an object (positional misalignment) between the two images, the distance to this object is detected.

CITATION LIST

Patent Literature

Japanese Unexamined Patent Application Publication No. 2012-118269

Non Patent Literature

C. Zhou, S. Lin and S. Nayar, "Coded Aperture Pairs for Depth from Defocus" In International Conference on Computer Vision, 2009

SUMMARY

Technical Problem

The present disclosure provides a depth estimation apparatus which achieves increased speed and precision.

Solution to Problem

A depth estimation apparatus according to the present disclosure includes: an imaging device which generates a first image signal and a second image signal by imaging an object at different phases; a storage unit configured to store model data defining a relationship between (i) lens blur and phase difference of the object in images and (ii) position of the object in the images in a depth axis; and a detecting unit configured to detect a position of the object in the depth axis from the first image signal and the second image signal, using the model data, wherein the phase difference between the first image signal and the second image signal is smaller than or equal to 15% in terms of a base line length.

Advantageous Effects

The depth estimation apparatus according to the present disclosure is effective in achieving increased speed and precision.

BRIEF DESCRIPTION OF DRAWINGS

These and other objects, advantages and features of the invention will become apparent from the following description thereof taken in conjunction with the accompanying drawings that illustrate a specific embodiment of the present invention.

FIG. 1 illustrates the operation according to the DFD method.

FIG. 2 illustrates the operation according to the phase difference detection method.

FIG. 6 is a block diagram of a depth estimation apparatus according to an embodiment.

FIG. 21 is a flowchart of depth estimation according to an embodiment.

DESCRIPTION OF EMBODIMENTS

Hereinafter, a non-limiting embodiment will be described in detail with reference to the drawings as necessary. Note, however, that detailed descriptions may be omitted where unnecessary. For example, detailed descriptions of well-known aspects or repetitive descriptions of essentially similar configurations may be omitted. This is to make the following description easier for those skilled in the art to understand and avoid redundancy.

Note that the inventor provides the accompanying drawings and the following description, not to limit the scope of the claims, but to aid those skilled in the art to adequately understand the present disclosure.

First, solutions to the problems according to the present disclosure and an advantageous effect of the solutions will be described.

Initially, the advantages and disadvantages of the DFD method and the phase difference detection method (on sensor phase difference detection method) will be described.

First, the DFD method will be described. FIG. 1 schematically illustrates the operation according to the DFD method.

As illustrated in FIG. 1, light from an object irradiates the image plane of the imaging device via the optical system (aperture, lens, and so on). Here, an image of the object with no lens blur can be obtained if the focal position in the image space and the position of the image plane match. If the focal position does not match the position of the image plane, lens blur according to this positional difference occurs. With the DFD method, the distance from a current focal position to the object (amount of defocus) is calculated based on the amount of lens blur.

Here, Equation (1) below is established given that a current image is Im, object texture information is Obj, an object distance is d, and a point spread function representing lens blur is PSF (d).

[Math. 1]

$$Im = Obj \otimes PSF(d) \quad (1)$$

However, it is not possible to calculate both the object texture information Obj and the object distance (amount of defocus) d from a single image Im. DFD requires at least two images having different focus positions as shown in Equation (2) below.

[Math. 2]

$$Im_1 = Obj \otimes PSF_1(d)$$

$$Im_2 = Obj \otimes PSF_2(d) \quad (2)$$

Equation (2) enables calculation of the object texture information Obj and the distance d.

As stated above, with DFD, two images having different focus positions are required and capturing of two images is time-consuming. Consequently, there is a delay before the amount of defocus is detected. Moreover, the fact that the focus position needs to be changed at high speed creates a need for a mechanism that changes the focus at high speed. In addition, when shooting a video, a wobbling operation is necessary for periodically changing the focus position during video-shooting.

Next, the phase difference detection method will be described. FIG. 2 through FIG. 5 schematically illustrate the operation according to the phase difference detection method.

Figure 3:
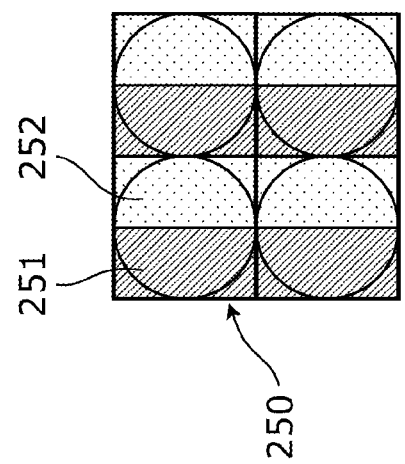
FIG. 3 illustrates an example of pixels used in the phase difference detection method.
Figure 5:
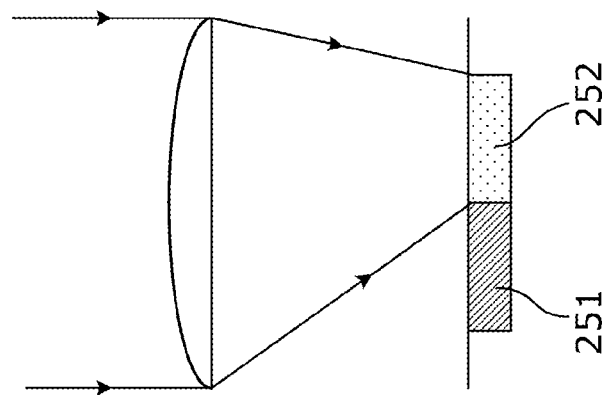
FIG. 5 illustrates light that enters a pixel according to the phase difference detection method.
Figure 4:
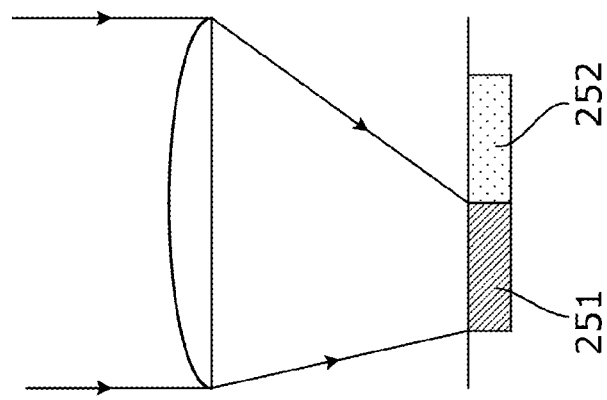
FIG. 4 illustrates light that enters a pixel according to the phase difference detection method.

For example, as illustrated in FIG. 3, each pixel 250 is divided into two light-receiving units (photodiodes) 251 and 252. Light is captured by each of the light-receiving units 251 and 252 independently, as illustrated in FIG. 4 and FIG. 5. Here, as illustrated in FIG. 2, of the light that enters the optical system, light entering the light-receiving unit 251 is light that travels along one side of the optical system, and light entering the light-receiving unit 252 is light that travels along the other side of the optical system. Therefore, there is a phase difference (image misalignment) between an image generated by a plurality of light-receiving units 251 and an image generated by a plurality of light-receiving units 252. With the phase difference detection method, the amount of defocus is calculated using this phase difference.

With the phase difference detection method, it is possible to determine whether the object is in front of the focus position or behind the focus position, based on the direction of the image misalignment. Thus, the amount of defocus can be detected from simultaneously captured images, for example, and the speed is therefore faster than the DFD method. On the other hand, the phase difference detection method requires addition of the pixel values of two pixels when an ordinary captured image is to be output. When adding up the two pixel values, it is necessary to avoid the amount of light from decreasing well below the amount of light in the ordinary case. This makes the base line length D shorter than that in DFD, and reduces the precision.

More specifically, the DFD method illustrated in FIG. 1 establishes the following relationship: D:b=Δ:(b−f) Here, 1/a+1/b equals 1/f, and thus Δ=D×(b−f)/b=D×f/a is established. That is to say, the amount of lens blur Δ increases with the base line length D, and thus the precision increases. It is to be noted that "a" denotes the distance between the object and the lens, "b" denotes the focal length in the image space, and "f" denotes the distance between the lens and the image plane. The base line length D denotes the diameter of light entering the imaging device, and is the aperture, for example.

The above relationship also applies to the phase difference detection method illustrated in FIG. 2. The image misalignment Δ increases with the base line length D, and thus the precision increases. However, with the phase difference detection method, only part of light passing through the aperture enters one pixel group as described earlier. The base line length D is the distance between the center (center of gravity), in the aperture, of a flux of light that enters one pixel group and the center (center of gravity), in the aperture, of a flux of light that enters another pixel group. In comparison with the DFD method assuming that the same optical system is used, the base line length D in the phase difference detection method is shorter, and the precision of the estimation is thus lower.

Furthermore, with the phase difference detection method, the above configuration makes the amount of received light somewhat less than that of an ordinary imaging device as described above, and thus the sensitivity decreases.

In addition, as illustrated in FIG. 3, in the case of dividing each pixel in order to simultaneously capture two images, the power consumption increases due to the increased number of pixels to be read.

As described above, the DFD method and the phase difference detection method both have advantages and disadvantages.

In view of this, the present disclosure provides a depth estimation apparatus which achieves increased speed and precision.

A depth estimation apparatus according to the present disclosure includes: an imaging device which generates a first image signal and a second image signal by imaging an object at different phases; a storage unit configured to store model data defining a relationship between (i) lens blur and phase difference of the object in images and (ii) position of the object in the images in a depth axis; and a detecting unit configured to detect a position of the object in the depth axis from the first image signal and the second image signal, using the model data.

This makes it possible to determine, using the phase difference of the object, whether the object is in front of the focus position or behind the focus position. It is therefore unnecessary to use a plurality of images having different focus positions. As a result, the depth estimation apparatus can achieve increased speed. Furthermore, the mechanism for changing the focus at high speed is no longer needed. Besides, the wobbling operation at the time of video-shooting is unnecessary. It is therefore possible to reduce the cost and increase the image quality. In addition, using the lens blur of the object increases the precision. The depth estimation apparatus can thus achieve increased speed and precision.

For example, the first image signal and the second image signal may be captured simultaneously.

The use of two images captured simultaneously makes it possible for the depth estimation apparatus to increase the speed of the estimation.

For example, the phase difference between the first image signal and the second image signal may be greater than or equal to 15% in terms of the base line length.

This makes it possible for the depth estimation apparatus to reduce the decrease in the amount of received light caused by the capturing of two images having a phase difference. As a result, the decrease in the sensitivity can be reduced.

For example, the imaging device may include a plurality of unit pixels each including: a red pixel which receives red light; a first green pixel and a second green pixel both of which receive green light; and a blue pixel which receives blue light, at least one of the following types of pixels: the red pixels, the first green pixels, the second green pixels, and the blue pixels, may be first pixels that are decentered in a first direction, the first pixels being included in the plurality of unit pixels and generating the first image signal, and at least one of the following types of pixels excluding the type of the first pixels: the red pixels, the first green pixels, the second green pixels, and the blue pixels, may be second pixels that are decentered in a second direction opposite the first direction, the second pixels being included in the plurality of unit pixels and generating the second image signal.

This makes it possible to capture two images having a phase difference, using pixels of each color included in a single imaging device. As a result, the power consumption can be reduced as compared to the case where pixels are provided for each of the two images.

For example, the first pixels may be the first green pixels, and the second pixels may be the second green pixels.

With this, capturing two images having a phase difference using only the green pixels lessens a false color.

For example, the model data may include pieces of reference data each associated with a different one of positions of the object in the depth axis, each piece of the reference data may include (i) first reference data defining the first image signal at an associated position and (ii) second reference data indicating lens blur of the object in the second image signal at the associated position, the phase difference of the object may be defined by a difference in position of the object between the first reference data and the second reference data, and the detecting unit may be configured to detect, as the position of the object in the depth axis, a position associated with one of the pieces of the reference data that most closely matches the first image signal and the second image signal.

This makes it possible for the depth estimation apparatus to detect the position of the object using the model data.

Furthermore, an imaging device according to the present disclosure includes a plurality of unit pixels each including: a red pixel which receives red light; a first green pixel and a second green pixel both of which receive green light; and a blue pixel which receives blue light, wherein at least one of the following types of pixels: the red pixels, the first green pixels, the second green pixels, and the blue pixels, are first pixels that are decentered in a first direction, and at least one of the following types of pixels excluding the type of the first pixels: the red pixels, the first green pixels, the second green pixels, and the blue pixels, are second pixels that are decentered in a second direction opposite the first direction.

This makes it possible to capture two images having a phase difference, using pixels of each color included in a single imaging device. As a result, the power consumption can be reduced as compared to the case where pixels are provided for each of the two images.

A depth estimation method according to the present disclosure includes: generating a first image signal and a second image signal by imaging an object at different phases; and detecting a position of the object in a depth axis from the first image signal and the second image signal, using model data defining a relationship between (i) lens blur and phase difference of the object in images and (ii) position of the object in the images in the depth axis.

This makes it possible to determine, using the phase difference of the object, whether the object is in front of the focus position or behind the focus position. It is therefore unnecessary to use a plurality of images having different focus positions. As a result, the depth estimation method can achieve increased speed. Furthermore, the mechanism for changing the focus at high speed is no longer needed. Besides, the wobbling operation at the time of video-shooting is unnecessary. It is therefore possible to reduce the cost and increase the image quality. In addition, using the lens blur of the object increases the precision. The depth estimation method can thus achieve increased speed and precision.

It is to be noted that these general or specific aspects may be implemented by a system, a method, an integrated circuit, a computer program, or a computer-readable recording medium such as a CD-ROM, or by any combination of a system, a method, an integrated circuit, a computer program, and a recording medium.

(Embodiment)

Hereinafter, an embodiment will be described with reference to FIG. 6 through FIG. 21.

(Configuration of Depth Estimation Apparatus)

FIG. 6 is a block diagram illustrating the configuration of a depth estimation apparatus 100 according to the present embodiment. The depth estimation apparatus 100 captures an image of an object, and detects from the captured image the position of the object in the depth axis. More specifically, the depth estimation apparatus 100 detects the amount of defocus indicating the distance between the current focus position and the object position.

For example, the depth estimation apparatus 100 is installed in an imaging device which is a digital still camera or a digital camcorder. The depth estimation apparatus 100 may also be installed in a device such as a smartphone. The amount of defocus detected by the depth estimation apparatus 100 is used by the imaging device for autofocus, for example.

It is to be noted that the depth estimation apparatus 100 may detect the distance between the object and the imaging device. The distance between the object and the imaging device can be calculated from, for example, the detected amount of defocus and the current focus position.

The depth estimation apparatus 100 illustrated in FIG. 6 includes an imaging device 110, a detecting unit 120, and a storage unit 130.

The imaging device 110 generates a first image signal 111 and a second image signal 112 by imaging an object at different phases. That is to say, the first image signal 111 and the second image signal 112 are images of the same object (scene) that are captured from different visual points. The first image signal 111 and the second image signal 112 are captured simultaneously, for example.

The depth estimation apparatus 100 is typically used for monocular cameras. That is to say, the first image signal 111 and the second image signal 112 are generated by the single imaging device 110 that uses a single optical system, for example.

More specifically, the imaging device 110 includes a plurality of first pixels decentered in a first direction and a plurality of second pixels decentered in a second direction opposite the first direction. The first pixels generate the first image signal 111 and the second pixels generate the second image signal 112. The details of the pixel configuration will be described later.

Figure 7:
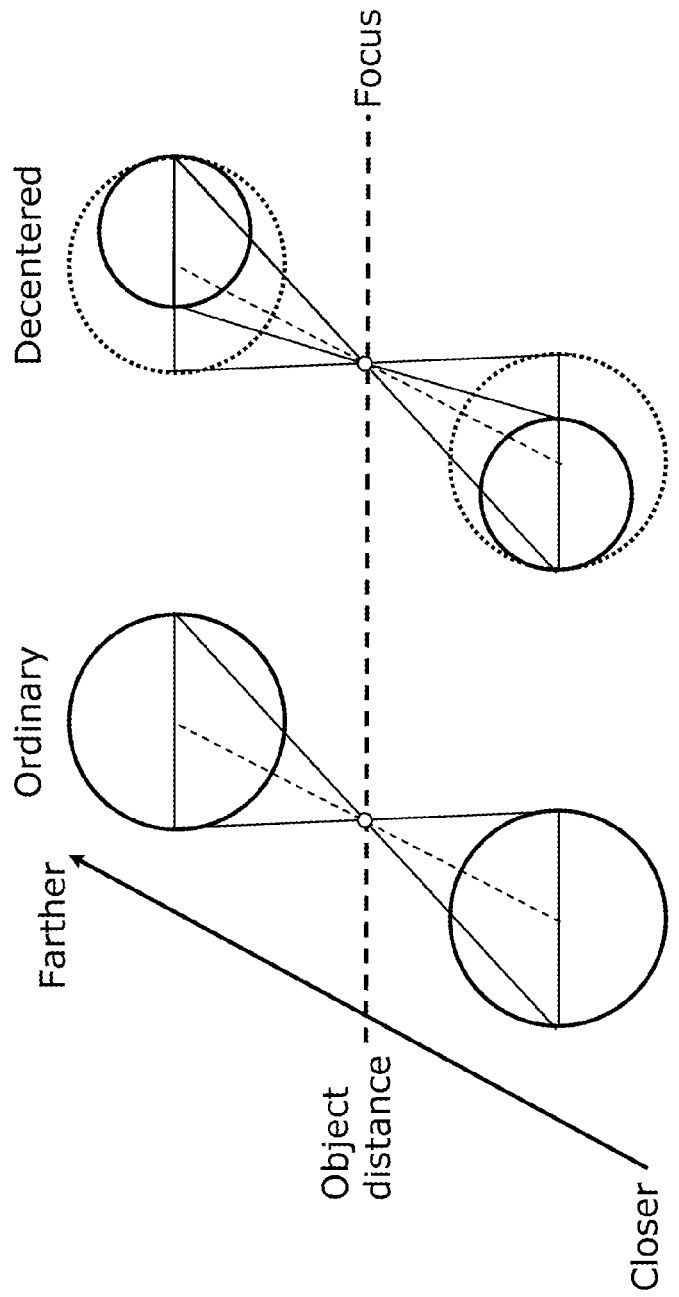
FIG. 7 illustrates a relationship between (i) object distance and (ii) lens blur and phase difference according to an embodiment.
Figure 9:
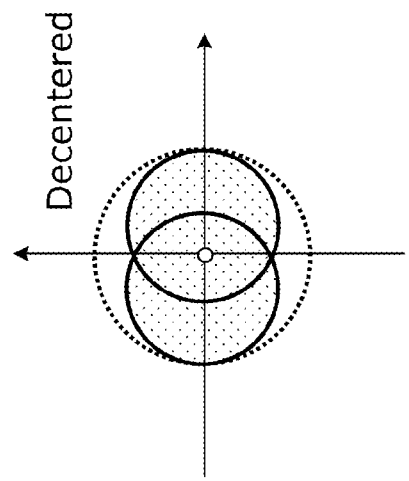
FIG. 9 illustrates lens blur in the case where pixels are decentered according to an embodiment.
Figure 8:
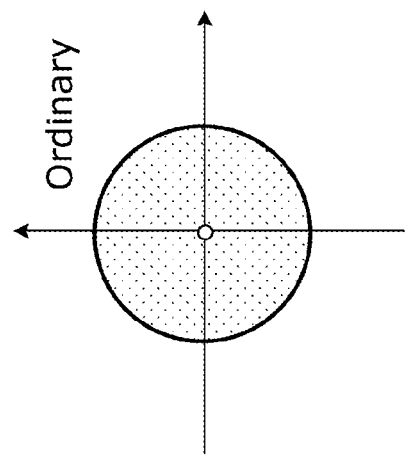
FIG. 8 illustrates lens blur in the ordinary case according to an embodiment.

FIG. 7 through FIG. 9 illustrate relationships between the image of the object and the object distance in the ordinary case and in the case where the pixels are decentered. In the ordinary case (pixels are not decentered), a change in the object distance does not cause a change in the object position, and only the lens blur changes. More specifically, the lens blur size increases with the distance between the focus position and the object. On the other hand, in the case where the pixels are decentered, a change in the object distance causes a change in, not only the lens blur, but also the object position. In the present embodiment, not only the lens blur but also the object position is taken into consideration.

Figure 10:
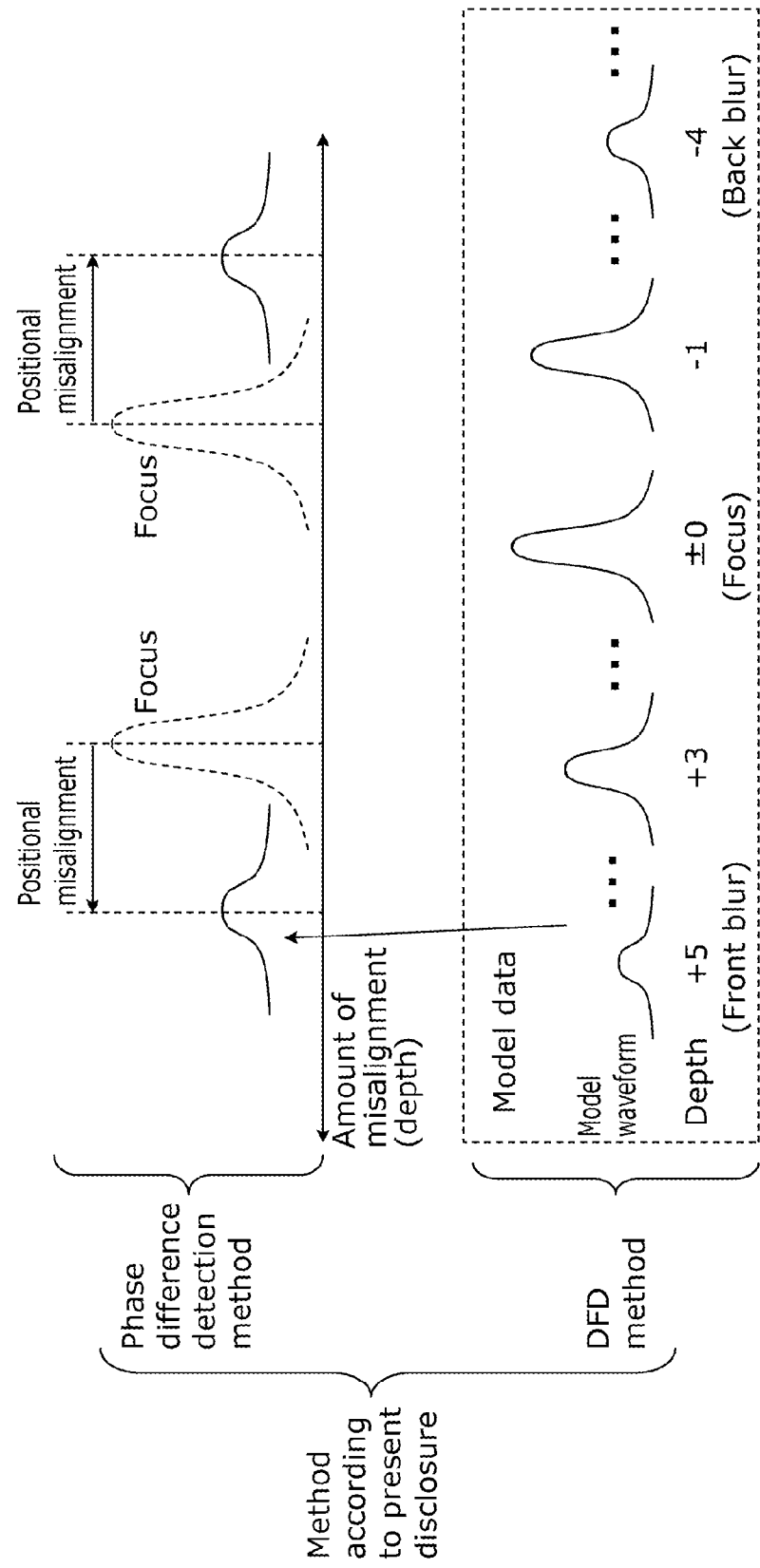
FIG. 10 illustrates depth estimation according to an embodiment.

FIG. 10 illustrates the phase difference detection method, the DFD method, and the method according to the present embodiment. As described earlier, with the phase difference detection method, the object distance is detected using the positional misalignment of the object from the focus position, whereas with the DFD method, the object distance is detected using the lens blur of the object. In the present embodiment, the object distance (amount of defocus) is detected using both of these.

The DFD method is more precise than the phase difference detection method. Thus, in the present embodiment, the object distance is detected using lens blur (DFD method) to achieve high precision. Furthermore, to address the disadvantage of DFD, i.e., increased delay caused by capturing of two images, single capturing is performed instead of capturing two images having different focus positions, but still, information indicated by two equations shown in Equation (3) below can be obtained.

[Math. 3]

$$Im_1 = Obj \otimes PSF_1(d)$$
$$Im_2 = Obj \otimes PSF_2(d) \qquad (3)$$

To be more specific, a difference in lens blur, i.e., a difference between PSF1 and PSF 2, is necessary even in the case of single capturing. Usually, no difference in lens blur occurs if at least the focus positions are the same. In the present embodiment, however, the idea of the phase difference detection method is adopted and a difference in lens blur is created using positional misalignment. That is to say, the structure on the imaging device is devised to generate, from one image captured, two images equivalent to the left and right images having a phase difference. By doing so, the present embodiment eliminates the need to capture two images having different focus positions, and thus increases the speed of the distance detection.

The storage unit 130 stores model data 131. The model data 131 is a parameter defining a relationship between (i) lens blur and phase difference of the object in images and (ii) position of the object in the images in the depth axis (amount of defocus).

The detecting unit 120 detects the position of the object in the depth axis (amount of defocus) from the first image signal 111 and the second image signal 112 using the model data 131 stored in the storage unit 130. The detecting unit 120 then generates defocus information 121 indicating the result of the detection.

Figure 11:
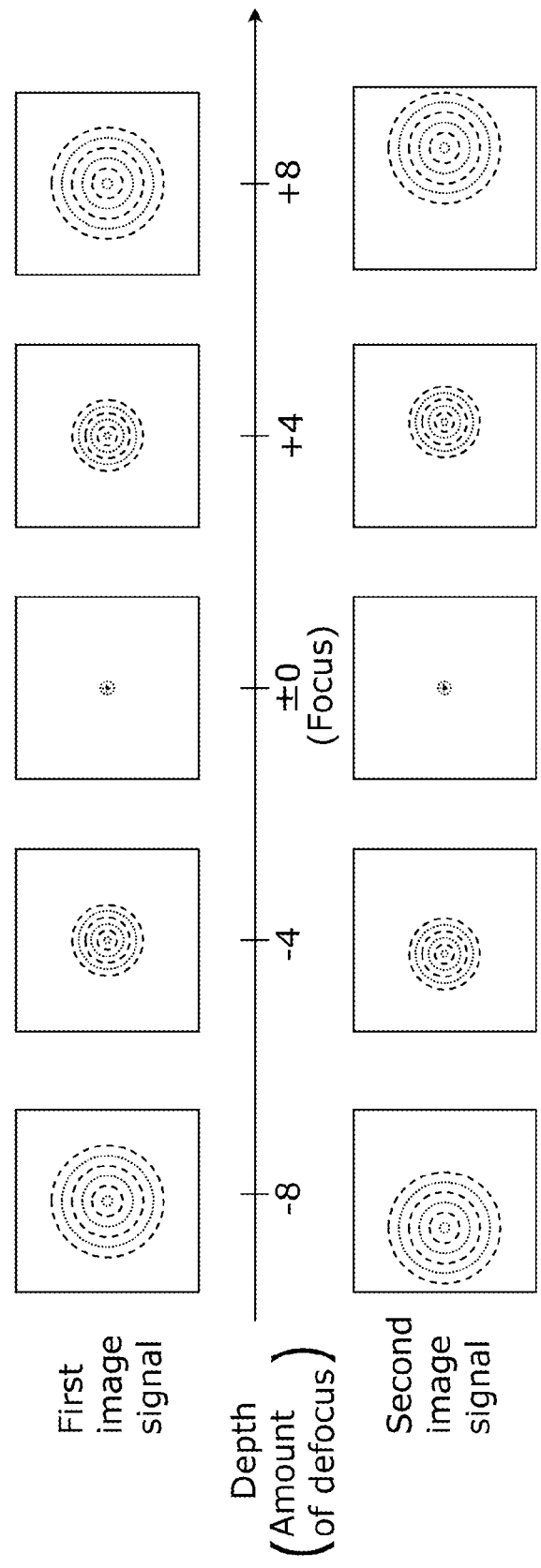
FIG. 11 illustrates an example of model data according to an embodiment.

FIG. 11 illustrates an example of the model data 131. As illustrated in FIG. 11, the model data 131 includes pieces of reference data each associated with a different amount of defocus. Each piece of the reference data defines lens blur and a phase difference (positional misalignment) of the object in the first image signal 111 and the second image signal 112 for the associated amount of defocus. More specifically, each piece of the reference data includes first reference data (upper row in FIG. 11) defining the first image signal for the associated amount of defocus, and second reference data (lower row in FIG. 11) indicating lens blur of the object in the second image signal for the associated position. The difference between the object position indicated in the first reference data and the object position indicated in the second reference data (relative positional misalignment) defines the phase difference of the object.

For example, the detecting unit 120 identifies, from among a plurality of pieces of reference data, a piece of reference data which most closely matches a pair of the first image signal 111 and the second image signal 112 which has been input. The detecting unit 120 then determines, as the amount of defocus of the object, the amount of defocus associated with the identified piece of reference data.

The use of the model data 131 illustrated in FIG. 11 enables adoption of the common technique used in the DFD method. With the DFD method, the amount of defocus is detected using model data and two image signals having different focus positions. By replacing the model data with the model data 131 and replacing the two image signals with the first image signal 111 and the second image signal 112 having a phase difference therebetween, it is possible to detect the amount of defocus of the object from the first image signal 111 and the second image signal 112 using the same algorithm as that of the DFD method. NPLT 1, for example, describes in detail the detection of the amount of defocus using two image signals and model data according to the DFD method.

The detection of the amount of defocus from the first image signal 111 and the second image signal 112 may be performed using a method other than the one described above. For example, the following method may be used: the absolute value of the amount of defocus is detected only from the amount of lens blur in one or both of the first image signal 111 and the second image signal 112, and it is determined whether the object is in front of the focus position or behind the focus position, based on the direction of the image misalignment.

(Configuration of Imaging Device 110)

Figure 12:
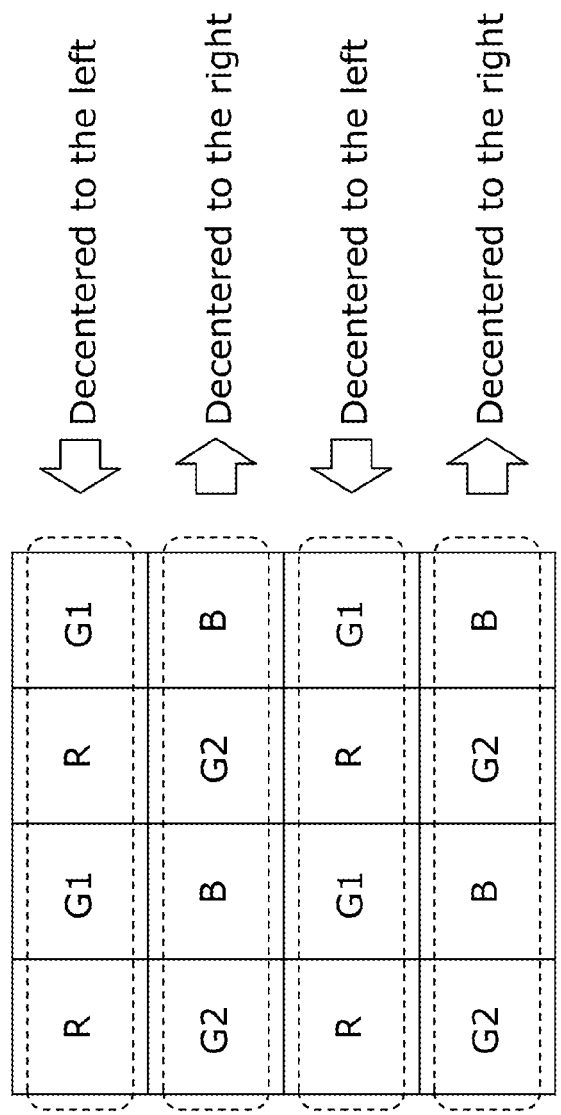
FIG. 12 illustrates an example of pixel configuration according to an embodiment.

FIG. 12 illustrates a configuration example of the pixels of the imaging device 110. As illustrated in FIG. 12, the pixels are disposed in Bayer arrangement. That is to say, the imaging device 110 includes a plurality of unit pixels. Each of the unit pixels includes a red pixel (R) which receives red light, a first green pixel (G1) and a second green pixel (G2) both of which receive green light, and a blue pixel (B) which receives blue light.

As described earlier, the imaging device 110 includes the plurality of first pixels decentered in the first direction and the plurality of second pixels decentered in the second direction opposite the first direction. In the example illustrated in FIG. 12, the red pixels (R) and the first green pixels (G1) are decentered in the left direction, and the blue pixels (B) and the second green pixels (G2) are decentered in the right direction.

Figure 13:
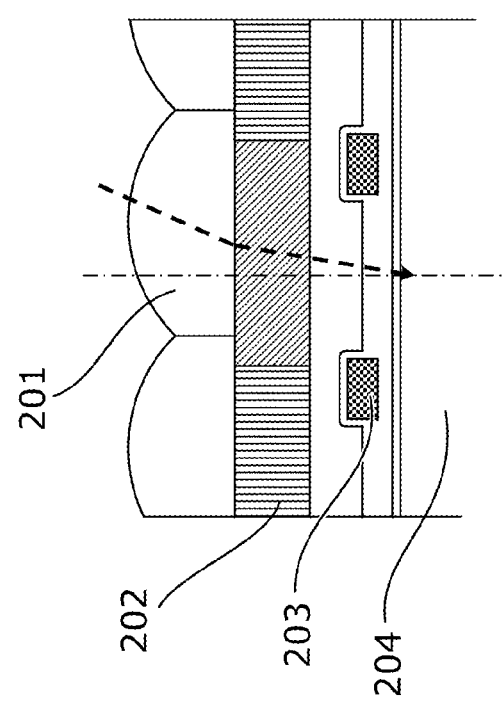
FIG. 13 is a cross-sectional view illustrating an example of a decentered pixel according to an embodiment.
Figure 14:
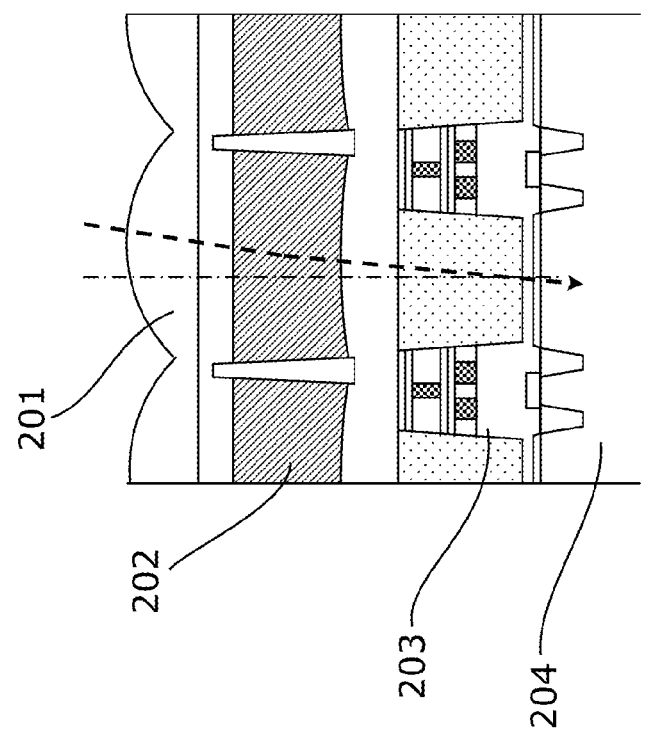
FIG. 14 is a cross-sectional view illustrating an example of a decentered pixel according to an embodiment.
Figure 15:
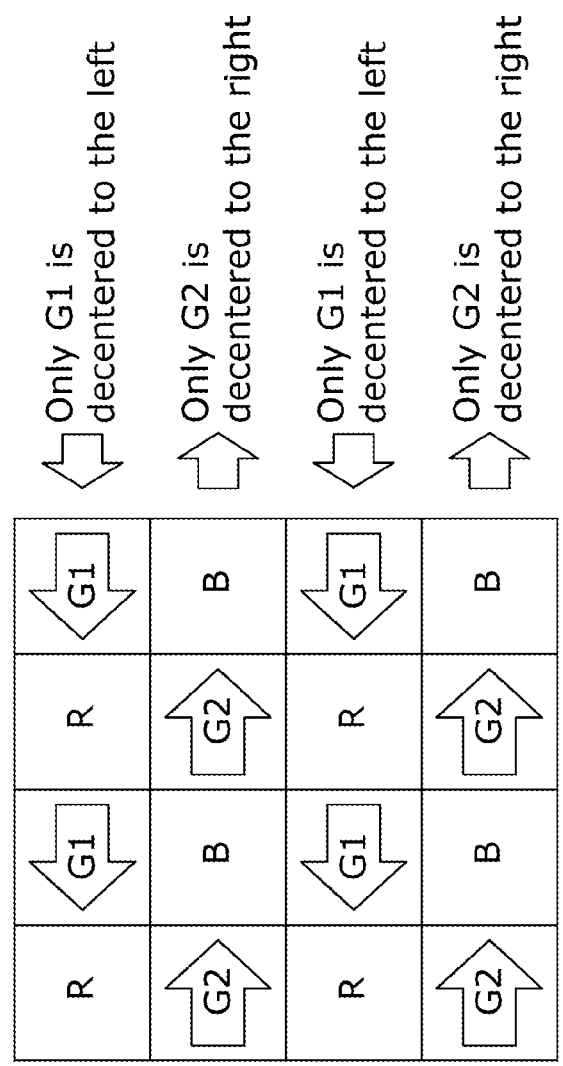
FIG. 15 illustrates an example of pixel configuration according to an embodiment.

To decenter each pixel, the optical waveguide may be decentered as illustrated in FIG. 13 and FIG. 14. For example, as illustrated in FIG. 13, a light-receiving unit (photodiode) is disposed in a semiconductor substrate 204 (silicon, for example). Above the semiconductor substrate 204, an optical waveguide interposed between light-shielding units 203 is disposed. Above the optical waveguide, color filters 202 are disposed, above which microlenses 201 are disposed. In such a case, by shifting the light-shielding units 203, the color filters 202, and the microlenses 201 (on-chip lenses) in the decentered direction relative to the center of the light-receiving unit, the ray of light received by the light-receiving unit can be angled (decentered).

On the other hand, decentering each pixel as illustrated in FIG. 12 may result in a false color. To lessen the false color, the arrangement illustrated in FIG. 15 may be adopted. In the example illustrated in FIG. 15, the first green pixels (G1) are decentered in the left direction and the second green pixels (G2) are decentered in the right direction. The red pixels (R) and the blue pixels (B) are not decentered. It is to be noted that in this case, the first image signal 111 is generated with the first green pixels (G1), whereas the second image signal 112 is generated with the second green pixels (G2). In other words, the red pixels (R) and the blue pixels (B) are not used for the distance detection. All the pixels are used for the ordinary image capturing, i.e., when the distance detection is not performed.

As stated above, the false color can be lessened by decentering the green pixels only. This configuration is thus beneficial for, for example, a high-end single-lens digital camera which is required to have high image quality.

Figure 16:
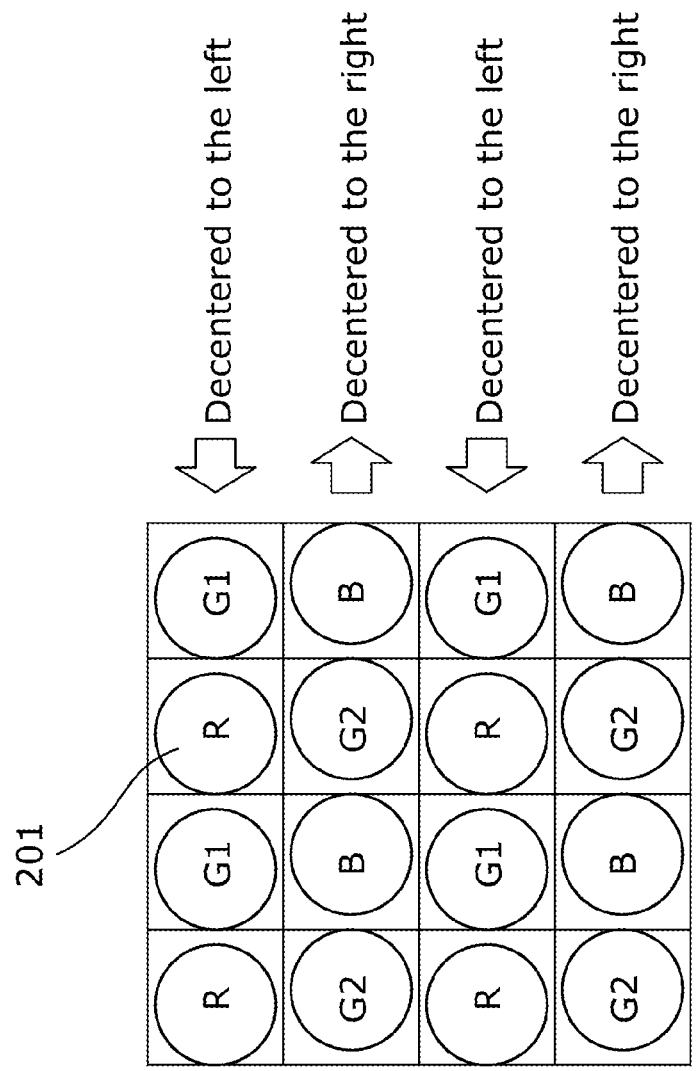
FIG. 16 illustrates an example of pixel configuration according to an embodiment.
Figure 17:
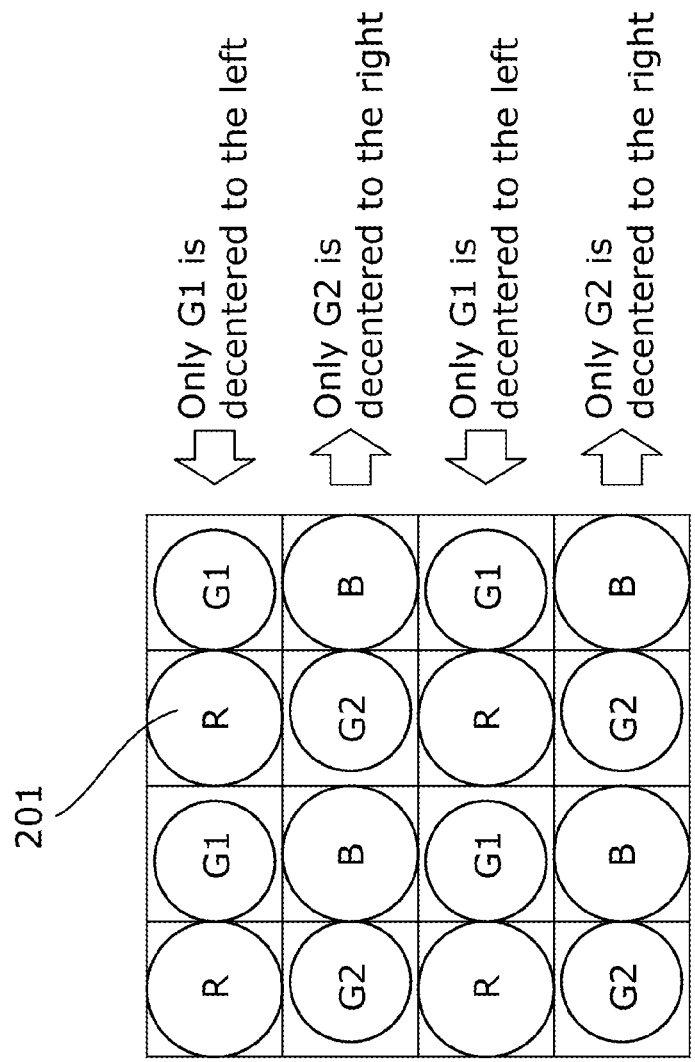
FIG. 17 illustrates an example of pixel configuration according to an embodiment.

Although the light-shielding units 203, the color filters 202, and the microlenses 201 are all shifted in FIG. 13 and FIG. 14, it is sufficient as long as at least a part of them is shifted. For example, only the microlenses 201 may be shifted as illustrated in FIG. 16 and FIG. 17. It is to be noted that FIG. 16 illustrates an example of the case where all the pixels are decentered as in FIG. 12, whereas FIG. 17 illustrates an example of the case where only the green pixels (G1 and G2) are decentered as in FIG. 15.

Shifting only the microlenses 201 can reduce stray light as compared to the case of shifting the optical waveguide. On the other hand, in the case of shifting only the microlenses 201, the microlenses 201 need to be smaller, and thus there is a disadvantage that the amount of received light (sensitivity) decreases.

The above-described example shows the case where the positions of the microlenses 201 are shifted. However, the center of gravity of the microlenses 201 may further be shifted, or only the center of gravity of the microlenses 201 may be shifted.

The above-described example shows the case where the decentering is performed within the imaging device. However, the optical system (the lens and the aperture, for example) included in the imaging apparatus may be devised to allow the first pixels and the second pixels to receive different light.

(Setting of Amount of Decentering)

Increasing the amount by which the pixels are decentered (hereinafter referred to as "amount of decentering") makes the phase difference more noticeable, but reduces the sensitivity due to a decreased amount of light. Furthermore, with the phase difference detection method, the amount of defocus is detected using misalignment, and it is thus necessary to set a reasonably large amount of decentering to increase the precision, while taking into consideration the trade-off between the precision and the sensitivity.

In contrast, in the present embodiment, the absolute value of the amount of defocus can be calculated with high precision from the amount of lens blur. It is thus sufficient as long as there is a minimum phase difference that enables the determination as to whether the object is in front of the focus position or behind the focus position. In other words, in the present embodiment, the amount of decentering is set small as compared to the phase difference detection method. This reduces the decrease in the sensitivity, which is the problem of the phase difference detection method. Moreover, a smaller amount of decentering makes it more difficult for human eyes to perceive the phase difference, and it is therefore possible to generate a natural image when capturing an ordinary still image or video.

Figure 18:
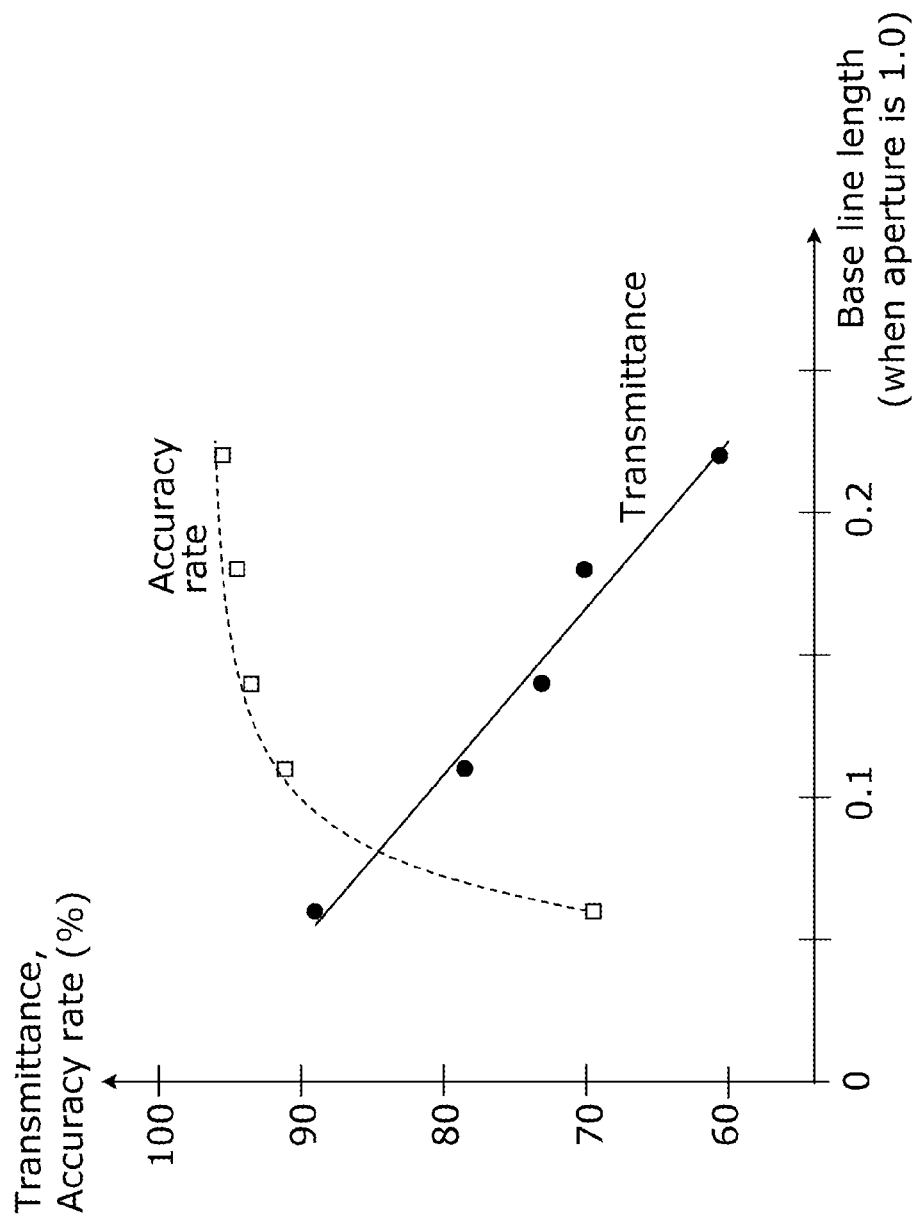
FIG. 18 is a graph illustrating a relationship between (i) base line length and (ii) transmittance and accuracy rate according to an embodiment.
Figure 20:
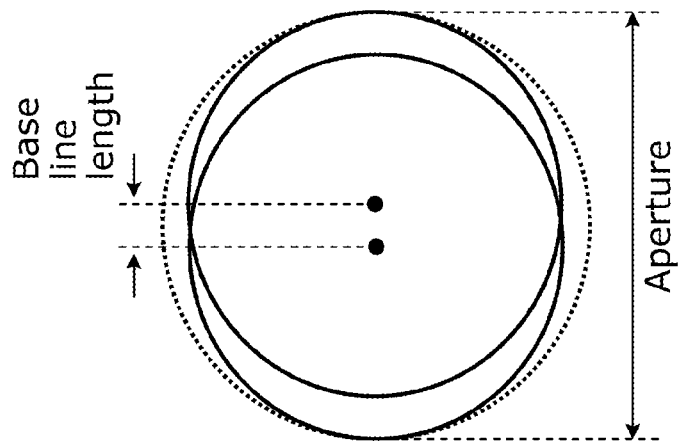
FIG. 20 illustrates a base line length according to an embodiment.
Figure 19:
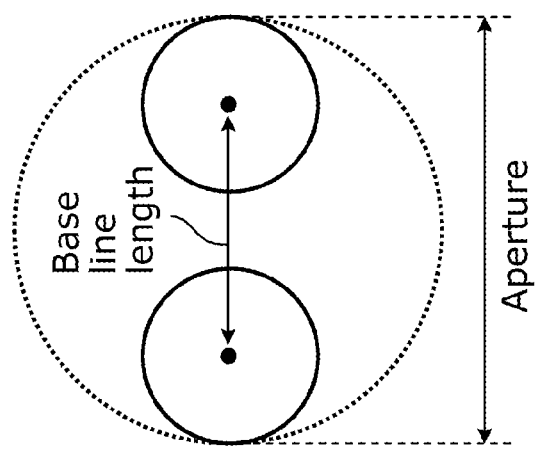
FIG. 19 illustrates a base line length according to an embodiment.

FIG. 18 illustrates transmittance (sensitivity) and accuracy rate (precision of the distance detection) in relation to the base line length, resulted from a simulation. Here, as illustrated in FIG. 19 and FIG. 20, the base line length is the distance, in the aperture, between the center (center of gravity) of light entering the first pixel and the center (center of gravity) of light entering the second pixel, for example. In FIG. 18, the base line length is represented by a value in relation to the aperture of 1. The aperture is the diameter of light entering the imaging apparatus. The base line length corresponds to the phase difference between the pixels. That is to say, the phase difference increases with the base line length, and thus the accuracy rate (precision of the distance detection) increases as illustrated in FIG. 18. Here, the accuracy rate refers to the rate at which the distance was accurately detected in relation to a test pattern.

On the other hand, the amount of light (transmittance) decreases with increase in the base line length, and thus the sensitivity decreases. To reduce the decrease in the sensitivity, the transmittance is kept greater than or equal to 70%, for example, and the base line length is set smaller than or equal to 0.15, for example. In other words, the phase difference between the first image signal 111 and the second image signal 112 is smaller than or equal to 15% in terms of the base line length, for example. A base line length which is too small leads to a sharp decrease in the accuracy rate. Thus, the base line length is set greater than or equal to 0.10, for example. In other words, the phase difference between the first image signal 111 and the second image signal 112 is greater than or equal to 10% in terms of the base line length, for example.

(Processing Flow)

Hereinafter, the processing flow of the above-described depth estimation apparatus 100 will be described with reference to FIG. 21.

First, the imaging device 110 generates the first image signal 111 and the second image signal 112 by imaging an object at different phases (S101). Next, the detecting unit 120 detects the position of the object in the depth axis (amount of defocus) from the first image signal 111 and the second image signal 112, using the model data 131 that is stored in the storage unit 130 and defines a relationship between (i) lens blur and phase difference of the object in images and (ii) position of the object in the images in the depth axis (S102).

(Conclusion)

As described above, the depth estimation apparatus 100 according to the present embodiment detects the amount of defocus using both the lens blur and the phase difference of the object. By doing so, it is possible to determine, using the phase difference, whether the object is in front of the focus position or behind the focus position, and thus a plurality of images having different focus positions are unnecessary. As a result, the depth estimation apparatus 100 can achieve increased speed of the estimation. In addition, the use of the lens blur of the object leads to increased precision of the estimation. The depth estimation apparatus 100 can thus achieve increased speed and precision.

Moreover, since the amount by which the pixels are decentered is reduced to an extent that the determination can be made as to whether the object is in front of the focus position or behind the focus position, it is possible to reduce the decrease in the amount of light received, and thus the decrease in the sensitivity can be reduced. Furthermore, the fact that the phase difference is small enables generation of natural images at the time of the ordinary image capturing.

A part of the pixels used for the ordinary image capturing is used for the generation of the first image signal 111, and another part is used for the generation of the second image signal 112. This enables reduction of the increase in the power consumption at the time of capturing images having a phase difference. In addition, the false color can be lessened by using only the green pixels for capturing images having a phase difference.

(Other Embodiments)

The above embodiment has been presented as an example of the technique disclosed in the present disclosure. The accompanying drawings and detailed description are provided for this purpose.

Thus, the structural elements set forth in the accompanying drawings and the detailed description include not only the structural elements essential to solve the problems but also structural elements unnecessary to solve the problems for the purpose of illustrating the above technique. For this reason, those unnecessary structural elements should not be deemed essential due to the mere fact that they appear in the accompanying drawings and the detailed description.

The above-described embodiment illustrates the technique of the present disclosure, and thus various modifications, permutations, additions, and omissions are possible in the scope of the appended claims and the equivalents thereof.

Each of the processing units included in the depth estimation apparatus according to the above embodiment is typically implemented as a large-scale integrated circuit (LSI). These may be implemented in a single chip individually, or in a single chip that includes some or all of them.

Furthermore, the means for circuit integration is not limited to an LSI, and implementation with a dedicated circuit or a general-purpose processor is also available. It is also acceptable to use: a field programmable gate array (FPGA) that is programmable after the LSI has been manufactured, and a reconfigurable processor in which connections and settings of circuit cells within the LSI are reconfigurable.

It is to be noted that in each embodiment described above, each structural element may be implemented by dedicated hardware or by execution of a software program appropriate for the structural element. Each structural element may also be implemented by reading and execution, by a program executing unit such as a central processing unit (CPU) and a processor, of a software program recorded on a recording medium such as a hard disk and a semiconductor memory.

The above-described cross-sectional views are to schematically illustrate the configurations according to the present disclosure. In these cross-sectional views, the corners and sides of each structural element are linearly drawn. However, structural elements the corners and sides of which are curved for manufacturing reasons are also included in the present disclosure.

The division of the functional blocks illustrated in the block diagrams is an example. A plurality of functional blocks may be implemented as one functional block, or one functional block may be divided into a plurality of blocks, or a part of the functions may be included in another functional block. Moreover, the functions of a plurality of functional blocks having similar functions may be performed by single hardware or software in parallel or by time division.

Furthermore, the order of performing the steps illustrated in the flowchart is one example given for specifically describing the present disclosure, and thus other orders may be adopted. In addition, a part of the steps may be performed simultaneously (in parallel) with another step.

Although only some exemplary embodiments of the present invention have been described in detail above, those skilled in the art will readily appreciate that many modifications are possible in the exemplary embodiments without materially departing from the novel teachings and advantages of the present invention. Accordingly, all such modifications are intended to be included within the scope of the present invention.

INDUSTRIAL APPLICABILITY

The present disclosure is applicable to imaging apparatuses that perform DFD processing. Specifically, the present disclosure is applicable to digital camcorders and single-lens digital cameras, for example.

The invention claimed is:

1. A depth estimation apparatus comprising:
   an imaging device which generates a first image signal and a second image signal by imaging an object at different phases;
   a storage unit configured to store model data defining a relationship between (i) lens blur and phase difference of the object in images generated by the imaging device, and (ii) a position of the object in the images in a depth axis; and
   a detecting unit configured to detect the position of the object in the depth axis from the first image signal and the second image signal, using the model data,
   wherein the phase difference between the first image signal and the second image signal is smaller than or equal to 15% of a diameter of light entering the imaging device.

2. The depth estimation apparatus according to claim 1, wherein the first image signal and the second image signal are captured simultaneously.

3. The depth estimation apparatus according to claim 1, wherein the phase difference between the first image signal and the second image signal is greater than or equal to 10% in terms of the base line length.

4. The depth estimation apparatus according to claim 1, wherein the imaging device includes:
   a plurality of first pixels decentered in a first direction; and
   a plurality of second pixels decentered in a second direction opposite the first direction,
   the first pixels generate the first image signal,
   the second pixels generate the second image signal, and
   the first pixels and the second pixels are decentered to make the phase difference between the first image signal and the second image signal smaller than or equal to 15% in terms of the base line length.

5. The depth estimation apparatus according to claim 4, wherein the imaging device includes a plurality of unit pixels each including:
   a red pixel which receives red light;
   a first green pixel and a second green pixel both of which receive green light; and
   a blue pixel which receives blue light,
   the first pixels are of at least one of the following types of pixels included in the unit pixels: the red pixels, the first green pixels, the second green pixels, and the blue pixels, and
   the second pixels are of at least one of the following types of pixels included in the unit pixels, excluding the type of the first pixels: the red pixels, the first green pixels, the second green pixels, and the blue pixels.

6. The depth estimation apparatus according to claim 5, wherein the first pixels are the first green pixels, and the second pixels are the second green pixels.

7. The depth estimation apparatus according to claim 1, wherein the model data includes pieces of reference data each associated with a different one of positions of the object in the depth axis,
   each piece of the reference data includes (i) first reference data defining the first image signal at an associated position, and (ii) second reference data indicating lens blur of the object in the second image signal at the associated position,
   the phase difference of the object is defined by a difference in the position of the object between the first reference data and the second reference data, and
   the detecting unit is configured to detect, as the position of the object in the depth axis, a position associated with one of the pieces of the reference data that most closely matches the first image signal and the second image signal.

8. An imaging device comprising:
   a plurality of unit pixels each including:
   a red pixel which receives red light;
   a first green pixel and a second green pixel both of which receive green light; and
   a blue pixel which receives blue light,
   wherein at least one of the following types of pixels: the red pixels, the first green pixels, the second green pixels, and the blue pixels, are first pixels that are decentered in a first direction,
   at least one of the following types of pixels excluding the type of the first pixels: the red pixels, the first green pixels, the second green pixels, and the blue pixels, are second pixels that are decentered in a second direction opposite the first direction, and
   the first pixels and the second pixels are decentered to make a phase difference between a first image signal and a second image signal smaller than or equal to 15% of a diameter of light entering the imaging device, the first image signal being generated by the first pixels, and the second image signal being generated by the second pixels.

9. A depth estimation method comprising:
   generating a first image signal and a second image signal by imaging an object at different phases; and
   detecting a position of the object in a depth axis from the first image signal and the second image signal, using model data defining a relationship between (i) lens blur and phase difference of the object in images generated by the imaging device, and (ii) the position of the object in the images in the depth axis,
   wherein a phase difference between the first image signal and the second image signal is smaller than or equal to 15% of a diameter of light entering the imaging device.

10. The depth estimation apparatus according to claim 1, wherein the detecting unit calculates the position of the object in the depth axis from current focus position, and an amount of defocus detected from the first image signal and the second image signal.

11. The imaging device according to claim 8, wherein the phase difference between the first image signal and the second image signal is greater than or equal to 10% of the diameter of light entering the imaging device.

12. The depth estimation method according to claim 9, wherein in the detecting, the position of the object in the depth axis from current focus position and an amount of defocus detected from the first image signal and the second image signal are calculated.

* * * * *